United States Patent

Stein

[15] 3,638,346
[45] Feb. 1, 1972

[54] FISHING TRAP

[72] Inventor: Julian Stein, 338 Farrway Drive, Franklin Square, N.Y. 11010

[22] Filed: Feb. 9, 1970

[21] Appl. No.: 9,539

Related U.S. Application Data

[63] Continuation-in-part of Ser. No. 770,032, Oct. 23, 1968, Pat. No. 3,494,064.

[52] U.S. Cl. .................................43/17.1, 43/65, 43/102
[51] Int. Cl. ...............................A01k 79/02, A01k 71/00
[58] Field of Search ...............43/100, 102, 103, 65, 66, 17.1

[56] References Cited

UNITED STATES PATENTS

| | | | |
|---|---|---|---|
| 1,146,911 | 7/1915 | Wilkerson | 43/102 |
| 2,102,628 | 12/1937 | Knerr | 43/102 X |
| 3,305,962 | 2/1967 | Abrahamsen et al. | 43/17.1 |

*Primary Examiner*—Warner H. Camp
*Attorney*—James P. Malone

[57] ABSTRACT

A fishing trap enclosure having a trapping section and a storage section connected thereto by a gate. The trapping section has an opening with cone-shaped guide ends connected to it. The enclosure is held with the opening facing the direction of current flow. Simulated flotsam and/or chum pots are located in a gathering area in front of the opening. Long-range directional sonic repelling devices are spaced around the gathering area so as to concentrate the fish into the gathering area. Other directional sonic devices drive the concentration of fish into the trap.

11 Claims, 3 Drawing Figures

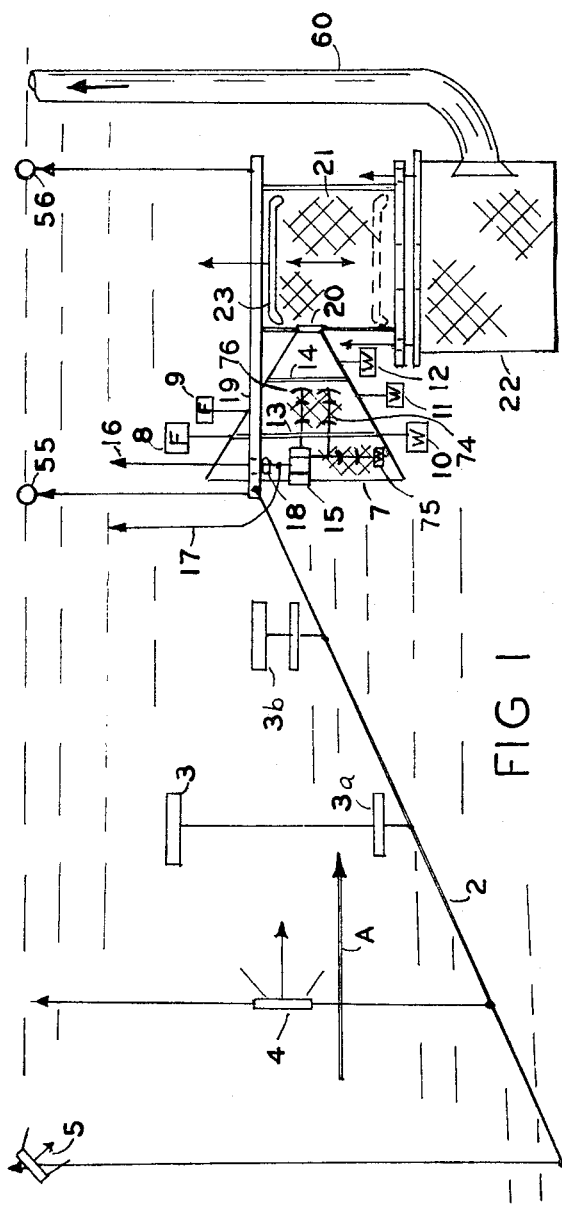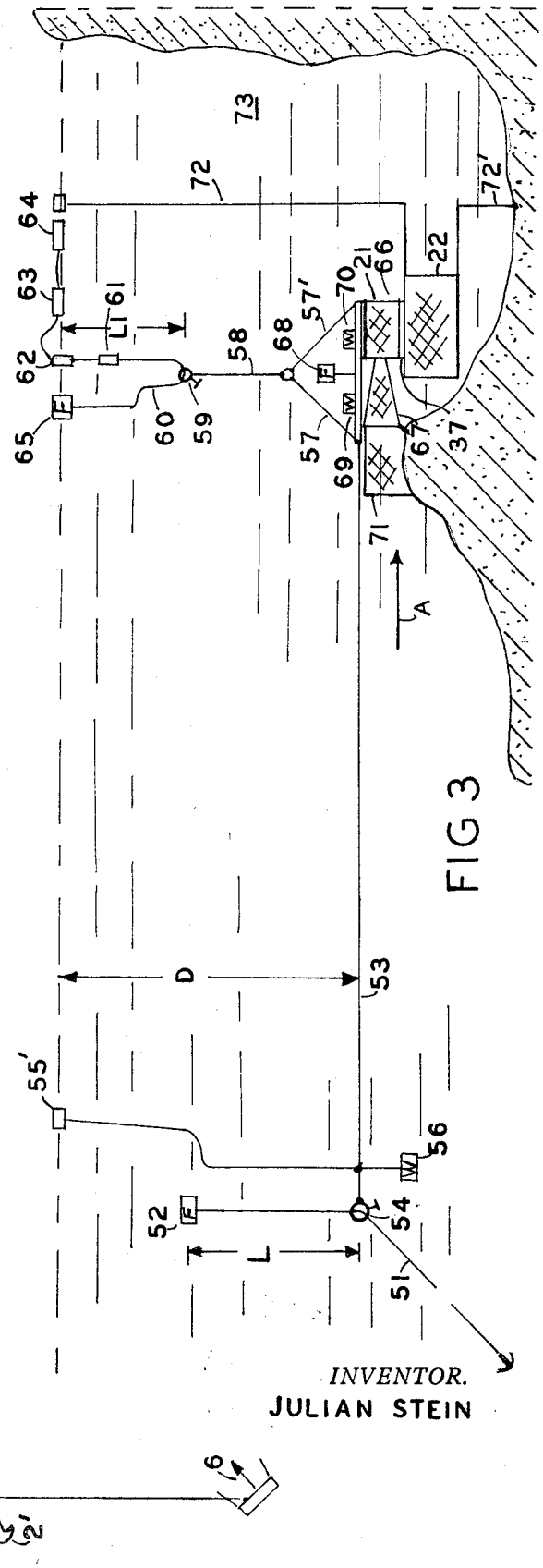

FISHING TRAP

This application is a continuation in part of my prior copending application, Ser. No. 770,032, filed Oct. 23, 1968, for FISHING TRAP, now U.S. Pat. No. 3,494,064.

This application relates to fishing traps and, more particularly, to a fishing trap having a trapping section and a storage section. Means are provided to periodically sweep the trapping section so as to drive fish through a closable gate into the storage section. The storage section may be periodically emptied of fish by the fisherman, for instance, once every few days.

My above-mentioned prior application showed a fishing trap with a trapping section and a storage section mounted side by side. The present application is an improvement thereon in several respects:

The trapping section has an opening with cone-shaped guide means to guide the fish into the opening.

The storage section is mounted underneath the trapping section and a gravity-operated sweeping device is provided to drive the fish from the trapping section into the storage section.

The present device is swingably mounted so as to hold a cone-shaped opening against the direction of the current.

Simulated flotsam and chum pot devices are provided in a gathering area in front of the opening in the trap.

Directional sonic repelling devices are located around the gathering area to drive fish into the gathering area.

One or more directional sonic repelling devices are located in front of the gathering area to drive the fish from the gathering area into the opening of the trap.

Accordingly, a principal object of the invention is to provide new and improved fishtrap means.

Another object of the invention is to provide new and improved fishtrap means comprising a trap enclosure and a storage enclosure.

Another object of the invention is to provide new and improved fishtrap means comprising a trap enclosure and a storage enclosure wherein the trap enclosure has an opening with cone-shaped guide ends extending from the opening and having a sweeping means in the trapping section to drive fish into the storage section.

Another object of the invention is to provide new and improved fishtrap means using simulated flotsam and an automatic time-released replenished supply of preserved chum to attract fish into an area in front of the trap.

Another object of the invention is to provide new and improved fishtrap means using directional sonic devices to drive fish into a gathering area in front of the trap.

Another object of the invention is to provide new and improved fishtrap means using sonic devices which may be aided by water current to drive fish from the area in front of the trap into the trap.

Another object of the invention is to provide efficient use of resources to catch fish from a volume of water which may be thousands of times larger than the trap itself.

Another object of the invention is to provide means to hold the trap at an adjustable depth.

These and other objects of the invention will be apparent from the following specification and drawings, of which:

FIG. 1 is a side view of an embodiment of the invention.

FIG. 3 is a side view of a modification of the invention.

Figure 2:
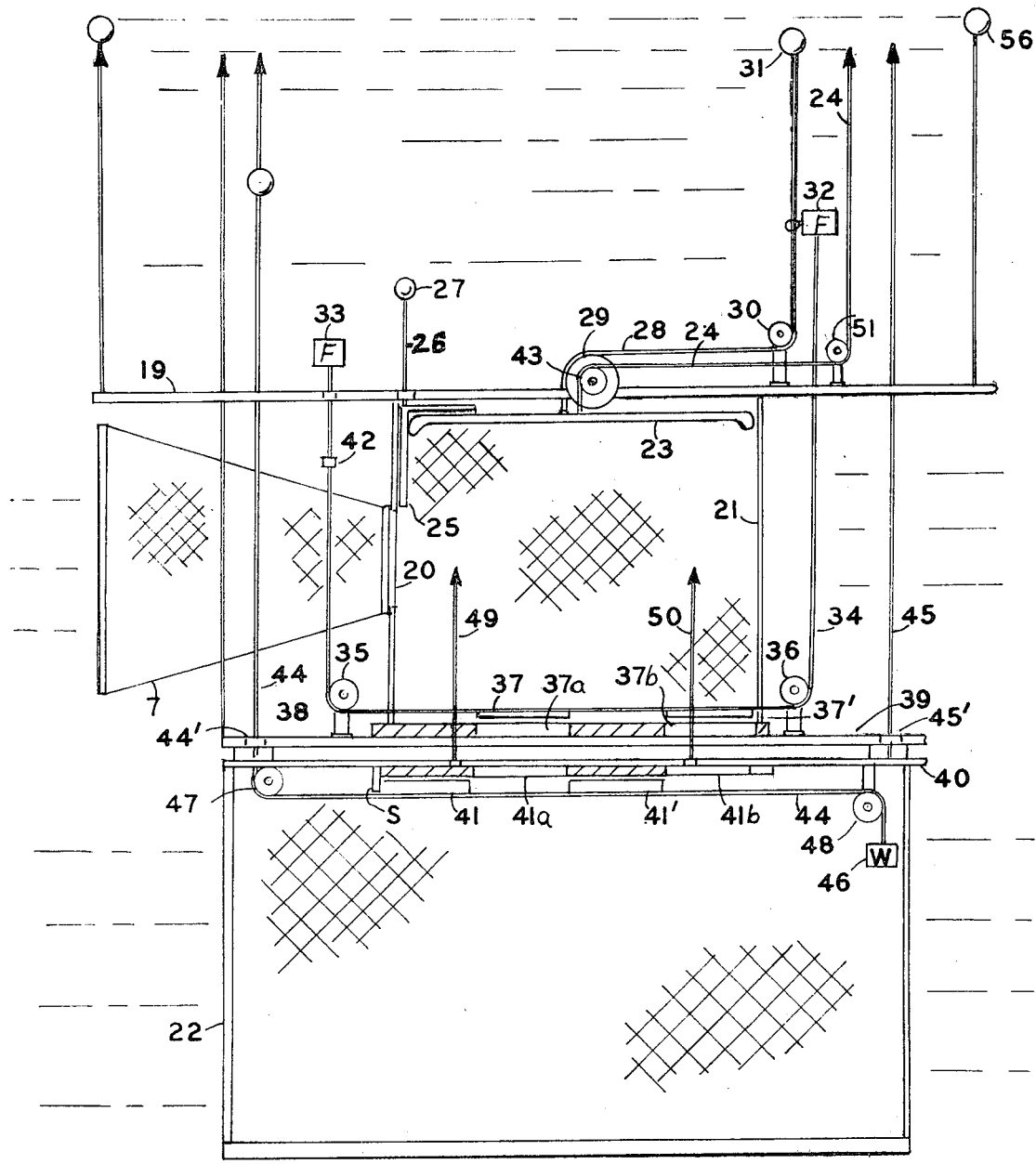
FIG. 2 is an enlarged side view of the embodiment of FIG. 1.

FIG. 1 shows a fishtrap enclosure held in place by an anchor cable 2. Floating above the anchor cable is flotsam 3, 3a, 3b such as tree branches. The area neighboring the flotsam 3 is called the gathering area. Also, floating from the anchor cable 2 is a sonic repulsion driver 4 and sonic repulsion concentrators 5 and 6.

The direction of the current is from left to right, as indicated by the current arrow A. The trap and all floating items connected to the anchor cable 2 are swung around by the current to line up with the current as indicated in FIG. 1.

The repulsion devices 4, 5 and 6 are directional underwater sound generators. The sound pattern is centered about the arrow. The repulsion concentrators 5 and 6 operate over a considerable range, directing fish from a very large volume of ocean water towards the gathering area.

Fish in the gathering area are attracted to the flotsam. Little fish like flotsam because it offers a place to hide and organisms to eat. Bigger fish are attracted to the flotsam in search of the little fish. The flotsam is directly in line and upstream from the mouth of the fishtrap intake guide 7. The intake guide is a cone-shaped or tapered net held open by floats 8 and 9 and by weights 10, 11 and 12. In addition, it is held open and in place by supporting members 13 and 14. Hanging at the center of the mouth of the intake guide is a chum pot bait dispensing and display device 15. The bait-dispensing device preferably has a group of compartments. Each compartment is insulated and has a quantity of bait preferably preserved with ice. A timing device triggers the opening of the compartments after each timed period. The compartment covers are preferably spring loaded and ready to swing open when they are triggered by the timer.

In order to increase the lure of the bait, it is preferably dispersed in a display pattern which may be readily seen, smelled or detected by the fish. Referring to FIG. 1, the compartment on the right side of the bait-dispensing and display device 15 is open. The preserved bait strung on lines 74, weight 75 and the drag units 76 have all fallen out of the open compartment. The weight 75 pulls one line down. Alternately, a float may be used to hold a line up. The drag units 76 are approximately equal in weight to the water which they displace and are shaped to have a high viscous drag. The drag units 76 pull a line to the right along with the current. The weight 75 and the drag units 76 are reusable. They can be easily clipped onto a new bait line when the bait-dispensing and display device 15 is reloaded aboard the servicing boat.

More particularly, the enclosure is held up by floats 55, 56, etc., and the assembly is anchored by anchor rope 2 connected to an anchor 2'. Only one anchor line is used which is attached to the enclosure in front of the opening so that the entire enclosure will swing so that the opening faces upstream against the direction of the current.

The enclosure comprises two main sections, the trapping section 21 and the storage section 22. Section 21 has an opening 20. In front of the opening 20 is mounted a cone-shaped or tapered guide 7 which is held in place by floats 8 and 9 and weights 10, 11 and 12.

At the bottom of the trapping section 21, there is a sliding door gate comprising sliding doors 37, 37', which open and close apertures 37a and 37b in the bottom 39 of section 21. The doors 37, 37' are mounted on rope 34 and are normally held closed by the float 32.

At the top of the storage section 22 is mounted another sliding door gate comprising doors 41, 41' and apertures 41a, 41b in top member 40. The doors 41, 41' are mounted on the rope 44 which runs over the pulleys 47 and 48, which is weighted at its lower end by the weight 46 which will close the gate when cable 44 is released.

The storage section 22 is detachable from the trapping section 21. It is normally held up under section 21 by ropes 44 and 45, and corresponding ropes on the other side. These ropes are normally held up by floats. When these ropes are released, the storage section drops of its own weight and will be pulled by the current away from the trapping section so that it can be raised for emptying by pulling on ropes 49 and 50 and corresponding ropes on the other side.

In order to keep contact and reattach the storage section to the trapping section, guide ropes 44, 45 pass through guide holes 44', 45' in the base of the trapping section. There are preferably four guide ropes, one in each corner. These ropes are made slack when the storage section is detached from the trapping section.

When it is desired to reattach the storage section to the bottom of the trapping section, the storage section is dropped below the level of the trapping section and then the slack guide ropes 44, 45, etc., are pulled up through the guide holes 44' and 45' to locate the storage section. Note that when the rope 44 is pulled up, the apertures 41a and 41b are opened. They will remain open until the rope 44 is released when it is desired to empty the storage section 22. Stop S indexes rope 44.

Alternatively, referring to FIG. 1, the storage section 22 may remain connected to the trapping section and it may be emptied out by means of a large suction pipe 60 which would pump the fish up to the servicing boat. This method is more expensive, but is also more convenient and efficient.

In order to increase the efficiency of the suction pipe 60, the entire trap may be pulled up close to the surface and a sweep means may be added to drive the fish towards the suction pipe 60.

In operation, a servicing boat arrives periodically several times a week to empty the trap. During a servicing visit, the empty bait display device 15 is brought up to the surface by lowering bait cable 16 and raising bait cable 17. Bait display device 15 is loaded with bait and ice aboard the servicing boat. The timer and spring-loaded covers are set manually. The loaded bait display device 15 is lowered back into position by lowering bait cable 17 and raising bait cable 16 until the stop ball 18 comes into contact with the support frame 19.

Periodically the fish in the gathering area are driven along with the current by an automatically timed sharp blast of noise from the repulsion driver 4. Fish from the first cluster of flotsam are driven towards the second cluster. Fish from the second cluster of flotsam are driven towards the bait display device 15, and from the bait display device, the fish are driven or swim down current into the intake guide 7 towards the entrance portal 20. Fish that enter the temporary storage area 21 tend to remain there for the following reasons:

1. The entrance portal is a very small portion of the total perimeter of the temporary storage area.
2. There is no guide leading back to the exit, like the one leading to the entrance.
3. The current tends to carry them away from the exit.

Periodically, the fish are driven from the temporary storage area 21 to a permanent storage area 22. This can be operated by an automatic timing device.

Details of the temporary and permanent storage area are shown in FIG. 2. Fish enter the temporary storage section 21 via the entrance portal 20. A driver 23 made of net material supported on a weighted frame is held up by the driver cable 24. When the driver cable 24 is released by a timing means, it rolls over pulley wheel 43 as gravity pulls the weighted driver 23 down, driving the fish towards the permanent storage section 22. As the driver 23 descends, it lowers the entrance portal cover 25. This prevents fish from escaping via the entrance portal 20 as the driver continues dropping. The weight of the portal cover 25 pulls down on the cover cable 26 and overcomes the slight buoyancy of the cover stop 27. When the cover stop 27 reaches the support frame 19, the entrance portal cover 25 hangs in front of the entrance portal 20.

As the heavy driver 23 descends, it also pulls down on the transfer cable 28. The transfer cable 28 rolls past the pulley wheels 29 and 30. As the driver 23 enters the last portion of its descent, the slightly buoyant transfer stop 31 comes into contact with the ring of the close float 32. The buoyant force of close float 32 is overcome and close float 32 is pulled down. This frees the open float 33 to pull the gate cable 34 over pulley wheels 35 and 36, opening the horizontal gate 37. The horizontal gate 37 is fully open when the gate stop 42 comes into contact with the support frame 19.

When the horizontal gate is open, two rectangular channels are open between the temporary storage area 21 and the permanent storage area 22. The fish swim through the openings in the horizontal gate, stationary mask 38, the temporary storage lower frame 39, the permanent storage support frame 40, and the open permanent storage gates 41a and 41b. The driver 23 continues descending until it is flush against the horizontal gate, and all fish are driven from temporary to permanent storage.

The driver is raised by a pull on the driver cable 24. This and all other rope pulling can be provided by a wide choice of motors, including but not limited to electric motors, wave-powered motors, and current-powered motors.

The driver cable 24 rolls past pulley wheels 43 and 51. As the driver is raised, it lifts open the entrance portal cover 25. It also releases the transfer cable 28 which releases the close float 32. The close float 32 has about two times the buoyant force of the open float 33. The close float 32, therefore, pulls the gate cable 34 lowering the open float 33 and closing the horizontal gate 37. The fishtrap 1 is now back in its original condition, ready to accept a new quantity of fish through the entrance portal 20.

Each time this catch and drive cycle is repeated, the caught fish accumulate in the permanent storage section 22. When the servicing boat arrives, the permanent storage section is raised as follows:

Four hold cables in the four corners of the permanent storage section, namely hold cable pairs 44 and 45, are released. The release of hold cable pair 44 permits weight 46 to pull the hold cable pair 44 around pulley wheel pairs 47 and 48, closing the permanent storage gate 41. The permanent storage section 22 drops downward and the current carries it to the right. After it clears the temporary storage section 21, the permanent storage section 22 is raised by the four lift cables, lift cable pairs 49 and 50. At the surface a wide choice of removal techniques are available, including but not limited to a suction pump, a suction pump and driver combination, or manually or motor-operated scoop nets.

Alternatively, the storage section may be mounted on top of the trapping section or alongside of the trapping section. This would simplify raising it to the surface to empty it.

The trap is limited to a size which can be enclosed, or covered by fabricated barrier materials such as nets. The expense for nets may be decreased by supplementing the nets with natural barriers. For example, if a trap is to be used at the surface of a body of water, the netting from the top of the trap may be omitted, and the surface will provide a natural barrier supplementing the fabricated materials.

Similarly, the intake guide, the trapping section and the storage section may use natural barriers as supplements to nets. For example, a natural partially enclosed body of water such as a small bay may be supplemented with nets to form a fully enclosed area. This enclosure, consisting of natural barriers and nets, may be used as the enlarged and extended storage section of a fishtrap. In this application of the invention, the enlarged storage section may also be used as a fish farm. When fish are driven through the trapping section exit gate into the enlarged storage section, they are enclosed in a fish farm.

The effectiveness of the trap is greatly enhanced by the use of an external attractive environment, the gathering area, the repulsion driver, and long-range repulsion devices.

The external attractive fish environment area is not enclosed. It, therefore, can be very large, with no investment for nets. The cost of tree branches for flotsam is nominal. The bait used for chum may be the low-grade fish caught in the fishtrap itself. Much of this low-grade fish would otherwise be sold as fertilizer.

A typical size for the external attractive environment area is on the order of five times the linear dimensions of the trap or about 125 times the volume of the trap.

Water is an excellent medium for the transmission of sound waves, and most fish are very sensitive to sound. A light tap on the side of a home fish tank is sufficient to cause the fish to instinctively and immediately turn and swim away from the source of the sound waves.

Powerful long-range sonic repulsion devices may operate at a distance of hundreds of feet from the gathering area, directing fish from a volume of water thousands of times as large as the volume of the trap itself.

Long-range repulsion devices cannot accurately direct fish to the trap, but many of the fish can be directed to swim within range of the attractive environment area of the large gathering area. The gathering area is located between the close-range repulsion drivers and the opening of the trap. From the gathering area, fish may be driven directly into the trap by the repulsion drivers.

The ocean current is an important aid to the repulsion drivers, but it is not essential. The trap does not have to be always swingably mounted on an anchor line, to line up with the current. A trap anchored to a fixed location and a fixed attitude may permit better utilization of a naturally attractive fish environment and natural barriers to supplement nets.

Referring to FIG. 3, the fishtrap may be swingably connected to horizontal cable 53 so that the opening faces the current arrow A. For this application, the trap would not be located close to the bottom as shown, the taper extension 71 and the storage extensions 72 and 72' would not be used. This would leave the trap completely disconnected from the bottom and free to swing into alignment with the current.

The net assembly may be mounted at various depths by choosing the weights and the buoyancy of the floats and adjusting the length of the holding lines and the anchor line.

FIG. 3 shows an anchoring means whereby an approximate depth D is maintained within a partial tolerance for a range of current velocity variations. Precision depth settings are not worth the expense of establishing them. In addition, the depth D may be varied manually by adjusting the lengths L and L' by an amount equal to the desired variation in depth D.

Anchor cable 51 is held down by the anchor and pulled up by float 52. Horizontal cable 53 is connected to the anchor cable 51 via a clamp ring 54. When clamp ring 54 is released, it is free to slide up and down along anchor cable 51. Clamp ring 54 may be pulled up by pulling on float 55' or it may be lowered by weight 56 if clamp ring 54 is released while there is slack to float 55. When the clamp ring is set at the proper depth, establishing length L, it is clamped in place.

The fishtrap 66 is pulled to the right by the current as shown by current arrow A. The fishtrap is restrained by horizontal cable 53. The trap is free to swing around anchor cable 51, and will be held so that the input guide 67 will have its opening facing the current.

The fishtrap is supported by cables 57 and 57' which are connected to cable 58. Cable 58 is connected to cable 60 by clamp ring 59 in such a manner that cable 60 may be pulled through clamp ring 59 while clamp ring 59 is released. To adjust length L', clamp ring 59 is released. Cable 60 may then be pulled toward float 62 to increase L' or it may be pulled toward float 65 to decrease L'. When the desired length L' is set, clamp ring 59 is clamped. This is done before submerging the net.

The fishtrap is almost balanced. It is slightly heavier than the water it displaces. The size and buoyant effect of balancing float 68 is selected to be sufficient to hold up the fishtrap and ballast weights 69 and 70. Weights 69 and 70 are composed of a plurality of removable segments. Segments of the ballast weights 69 and 70 are added or deleted to cause a net downward force to equal the small buoyant force of float 61 and the buoyant force of partially submerged float 62. In a slow current, the fishtrap is stabilized as shown. Small waves will completely cover float 62 and will apply a gentle tug to the trap which will move slightly. Larger waves submerging both float 62 and the rope between floats 62 and 63 will have a similar gentle effect. When the waves are large enough to submerge floats 62 and 63, a double-size gentle pull will be transmitted to the fishtrap. Since floats 61, 62, 63 and 64 are only required to buoy up the slight unbalance of the fishtrap, the maximum buoyant force of these floats is fairly small, and the surface disturbance transmitted to the fishtrap is similarly small.

Floats 55, 65, 61, 62, 63 and 64 are located at or near the surface. They are small, lightweight, low-buoyancy floats made of a soft plastic foam material. As such, they are no hazard to ships. Float 52 and the fishtrap are located well below the surface so that ships can pass above them with considerable margin.

Another application of the invention is also shown in FIG. 3. The trap is fixed at a location where it may utilize natural barriers to extend the intake guide 67 and the storage section 22. For this application, the ability to swing into alignment with the current is not available. The taper extension 71 uses the natural slant, hollowed-out shape or taper of the bottom to form an enlarged and extended intake guide. The tapered intake passage is bounded by the net barriers of the intake guide 67 and the taper extension 71 in combination with the bottom which forms a portion of the extended intake guide. Storage section extensions 72 and 72' are added to the storage section 22 to form the enlarged storage section 73. The net barrier between the original storage section 22 and the added storage area is removed so that fish are free to swim between these two storage areas which form the enlarged storage section 73. The enlarged storage section is bounded by the surface, the bottom, the shore, storage section extensions 72 and 72', including appropriate side sections, storage section 22 and horizontal gate 37 of the trapping section 21. The enlarged storage section 73 may be used as a fish farm.

I claim:

1. Fishtrap means comprising first and second enclosure means consisting of supporting members and barriers, said barriers include nets, said first enclosure comprising a trapping section, and said second enclosure comprising a storage section, an entrance gate opening in one side of said trapping section, means to hold said first enclosure with said opening facing the water current, guide means forming a tapered passage consisting of supporting members and barriers, said passage connecting at its small end with said opening, and said barriers include nets, a movably mounted exit gate adapted to control passage between said trapping section and said storage section, a movable sweep member mounted in said trapping section, and means to cause said sweep member to drive fish from said trapping section through said exit gate into said storage section.

2. Apparatus as in claim 1 wherein said sweep member is gravity operated.

3. Apparatus as in claim 1 wherein said sweep member is connected to close said entrance gate and open said exit gate as said sweep member drives fish out of said trapping section into said storage section.

4. Apparatus as in claim 1 wherein said storage section is releasably connected to said trapping section and is removable and having means to remove said storage section from said trapping section, including means to close said storage section, thereby enclosing fish in the storage section during removal.

5. Apparatus as in claim 1 having means to cause fish to enter said trap, comprising means to cause fish to gather in front of said opening of said trap and to drive the gathered fish into said trap, said gathering means including long-range directional repelling devices and means to provide an attractive fish environment, said repelling devices comprising a plurality of directional sound generators, said means for providing an attractive environment including simulated flotsam and apparatus to replenish a supply of preserved chum over an extended period, said means to drive gathered fish into said trap to include repulsion drivers, and said attractive fish environment means and means to hold said repulsion drivers, said attractive environment means and said trap in a position to permit said repulsion drivers to drive the gathered fish directly into said trap or drive the gathered fish into said trap with the aid of water current, said repulsion drivers consisting of a plurality of directional sound generators, and said holding means to include buoyant members and weighted members connected to an anchor line.

6. Apparatus as in claim 5 wherein chum is automatically released, dispersed and displayed in a pattern where it can be easily seen, smelled or otherwise detected by fish, said dispersal and display apparatus including a plurality of compartments adapted to be triggered by a timer, each compartment containing lines strung with chum, said lines adapted to be held extended by weights, floats and drag units which will be pulled by the current.

7. Apparatus as in claim 5 having means to automatically release chum and disperse and display said chum in a pattern wherein said chum can be easily seen, smelled, or otherwise detected by fish.

8. Apparatus as in claim 1 having means to cause fish to gather in front of said opening in said trap including a plurality of long-range repelling devices, simulated flotsam and apparatus to supply preserved chum,
 said repelling devices consisting of sound generators, and
 said simulated flotsam consisting of tree branches supported by anchor cables.

9. Apparatus as in claim 1 having means to drive fish into said trap consisting of repulsion drivers, an attractive fish environment means, and means to hold the attractive fish environment means between the repulsion drivers and the opening in said trap,
 said repulsion drivers consisting of sound generators,
 said attractive environment means consisting of simulated flotsam and apparatus to supply preserved chum over an extended period,
 and said holding means comprising cable connections to anchor means.

10. Apparatus as in claim 1 wherein said means to hold said opening facing the water current comprises an anchor and line connecting said anchor to said enclosure,
 a plurality of buoyant members and weighted members connected to said anchor line, said members being formed to simulate flotsam.

11. Apparatus as in claim 1 having means to swingably hold said trap at an adjustable depth with only a small and limited amount of wave motion disturbance transmitted from the surface to the trap, said means consisting of,
 an anchor cable, anchored at the lower end and held up by a float at the upper end,
 a horizontal cable with means adjustably connected at one end to any point of said anchor cable and held at said adjustment point and connected at the other end to said fishtrap,
 said horizontal cable being held in an approximately horizontal position,
 floats and weights to approximately balance the trap, leaving only a small net downward force including small surface floats to buoy up the slight unbalance of said trap,
 said small surface floats transmitting only a small amount of surface disturbance to said trap,
 an adjustable length of cable between said surface floats and said trap,
 means to hold said cable at said adjusted length.

* * * * *